June 23, 1970 J. P. FOLEY 3,516,188

INDEX SECURING ARRANGEMENT

Filed Feb. 8, 1968 2 Sheets-Sheet 1

INVENTOR.
JAMES P. FOLEY
BY
Ward, Haselton, McElhannon, Brooks & Fitzpatrick
ATTORNEYS June 23, 1970 J. P. FOLEY 3,516,188

INDEX SECURING ARRANGEMENT

Filed Feb. 8, 1968 2 Sheets-Sheet 2

INVENTOR.
JAMES P. FOLEY

BY

Ward, Haselton, McElhannon, Brooks & Fitzpatrick
ATTORNEYS

United States Patent Office 3,516,188
Patented June 23, 1970

3,516,188
INDEX SECURING ARRANGEMENT
James P. Foley, 748 Forest Ave., Larchmont, N.Y. 10538
Filed Feb. 8, 1968, Ser. No. 703,951
Int. Cl. G09f 3/00
U.S. Cl. 40—336 8 Claims

ABSTRACT OF THE DISCLOSURE

Arrangements for holding spiral bound index sheets in an under-the-telephone index device wherein alignment lugs are provided on the index carrier and these fit into holes on the bottom index sheet and the spiral binding on the sheets hangs over the edge of the carrier.

This invention relates to telephone index devices; and more particularly it concerns improvements to such devices enabling more convenient access to the telephone number and other information carried by them.

The present invention is particularly advantageous in conjunction with telephone index devices of the type shown and described in U.S. Pat. No. 3,243,908 to J. P. Foley. These devices comprise a frame member which fits under a telephone and is attached to the telephone itself by elastic bands or attachment tabs. A slide member is mounted on the frame member to slide in and out from under the telephone in drawer-like fashion. A handle is provided on the front of the slide member; and index sheets or telephone listing sheets are arranged in a stack on the slide member to move in and out with it through a narrow horizontal slot in the front of the frame member.

This general type of telephone index device has met with widespread acceptance. It is inexpensive to manufacture and ship; and it is convenient to use. Furthermore, while it is intimately associated with the telephone and therefore is both readily available and inconspicuous, it does not interfere with the normal functioning of the telephone and requires no special permit for its use.

Under-the-telephone type index devices are, however, limited in the amount of space available to them since modern cradle type telephones are built on very short legs and provide a very narrow clearance between their bottom or base member and the surface on which they rest. As a result earlier index sheet arrangements were either loose and unhinged or they were hinged at the back thereof. Attempts were made at forming book-like arrangements with staple hinges; however, none of these permitted one hand manipulation of the slide member and index sheets in a convenient manner. The loose sheets would become separated and lost or destroyed. The back-hinged sheet arrangements would not stay open and the staple-hinged sheet arrangements would not lie flat. Spiral binding concepts had been considered, but the spiral diameter required for a given thickness of sheets was too great to fit within the narrow slot-like opening at the front of the frame member.

The present invention provides a telephone index construction in which the individual index sheets are hinged in book-like fashion to lie flat for convenient use. According to the present invention, telephone index sheets are hinged together by means of a helical wire binding; yet the binding easily slides through the very narrow opening provided in the front of the frame member.

The present invention achieves these results by a unique arrangement of the spiral binding and the drawer slide member. According to one aspect of the present invention the spiral binding is not used to secure the index sheets to the slide member, but instead it is used only to hinge the individual sheets together. Although it would appear that passing the spiral binding through the slide member as a bottom sheet would serve to reduce the vertical displacement of the binding in the front slot of the frame member, it has been discovered that a far greater reduction in vertical displacement can be obtained by making the binding of a diameter sufficient only to hold the index sheets together and then to secure the bottom index sheet to the drawer slide member by other means, such as tape, adhesive, etc. Moreover, by positioning the hinged index sheet arrangement such that the spiral binding lies alongside but out from the lateral edge of the drawer slide member, an even further reduction in vertical displacement can be obtained.

According to a further aspect of the invention, means are provided to ensure the proper placement of the telephone index sheets on the slide member so that the spiral binding will lie closely adjacent the edge of the slide member without actually resting on it. This further aspect of the invention involves the provision of minute lugs at strategic locations on the slide member. These lugs cooperate with precut holes in the lower sheet of the index assembly to ensure proper lateral placement. This system of lugs and holes may be used advantageously with or without the use of adhesive and tape for additional holding effect.

Various further and more specific objects, features and advantages of the invention will appear from the description given below, taken in connection with the accompanying drawings, illustrating by way of example a preferred form of the invention.

Figures 1, 3, 4:
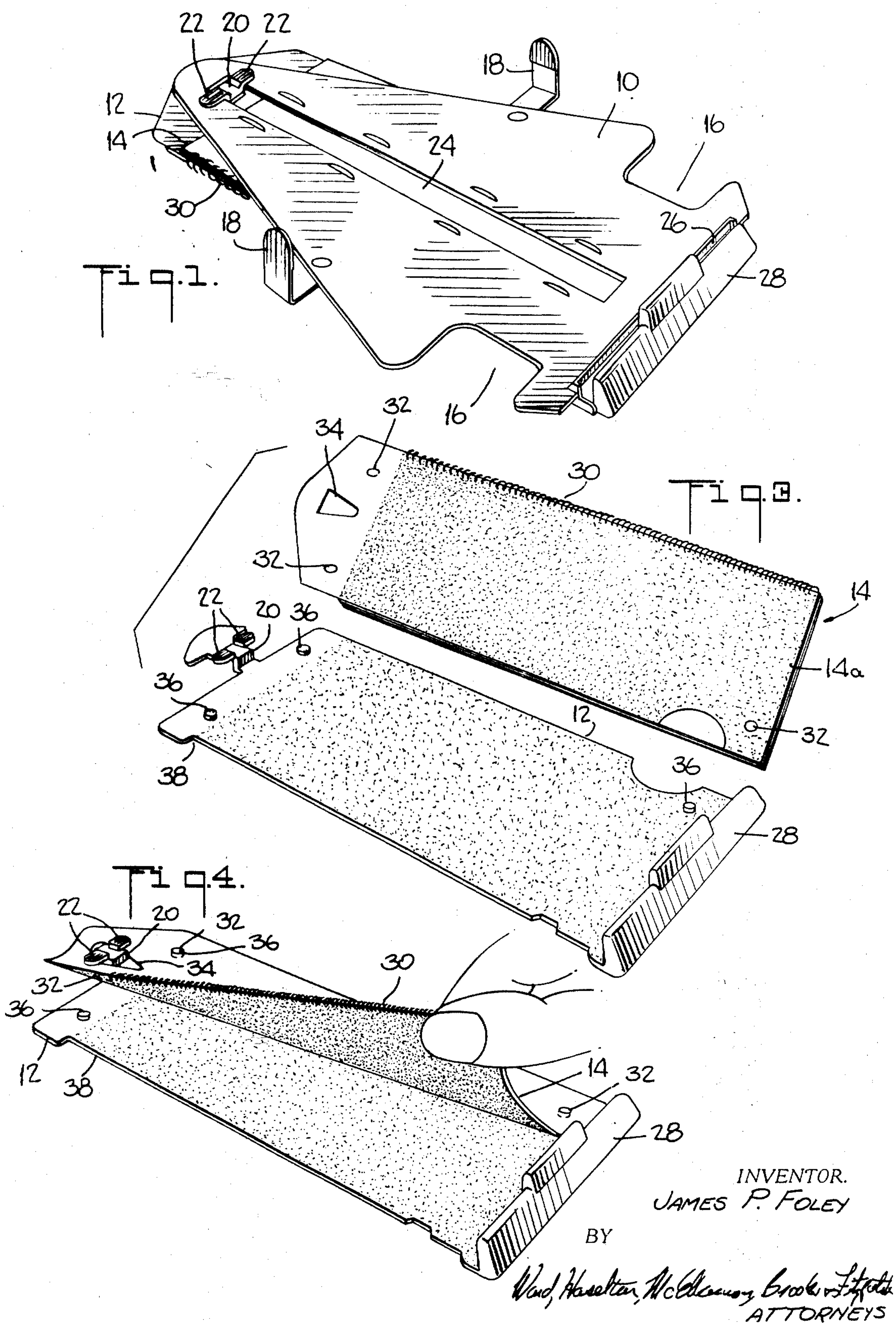
FIG. 1 is a perspective view of a telephone index device embodying the present invention.
FIG. 3 is an exploded perspective view of a slide member and index sheet arrangement forming a portion of the device of FIG. 1.
FIG. 4 is a perspective view illustrating the assembly of the elements shown in FIG. 3.

The overall construction of the telephone index device shown in FIG. 1 is similar to that of the aforementioned Foley patent (No. 3,243,908). Thus it comprises an essentially flat frame member 10 and a drawer-like slide member 12 on which is carried an arrangement of index sheets 14. The frame member 10 is made of plastic or similar material and is configured to fit under and to be secured to the bottom of a cradle type telephone. To this end the frame member is provided with front cut-outs 16 to fit closely around the front legs of the telephone; and it is provided with lateral attachment tabs 18 which extend up from the sides of the frame member into the spaces between the cover and base plate of the telephone. The attachment tabs 18 and the front cut-outs 16 cooperate to hold the frame member 10 securely in place under a telephone.

The drawer-like slide member 12 is also of plastic and is of generally flat rectangular configuration. The rear edge of the slide member is formed with a central upwardly projecting guide lug 20. A pair of laterally projecting tabs 22 extend from the lug 20; and the tabs and lug extend up through a central longitudinal slot 24 in the frame member as shown in FIG. 1. At the same time the front end of the slide member 12 projects out through a transverse slot 26 formed just beneath the front edge of the frame member 10. This arrangement permits the flat drawer-like slide member 12 to be suspended immediately beneath the frame member 10 in a manner allowing it to slide out and back between the positions shown in FIGS. 1 and 2. A handle 28 is formed on the front edge of the slide member 12 to facilitate this action.

Figures 2, 5, 6, 7, 8:
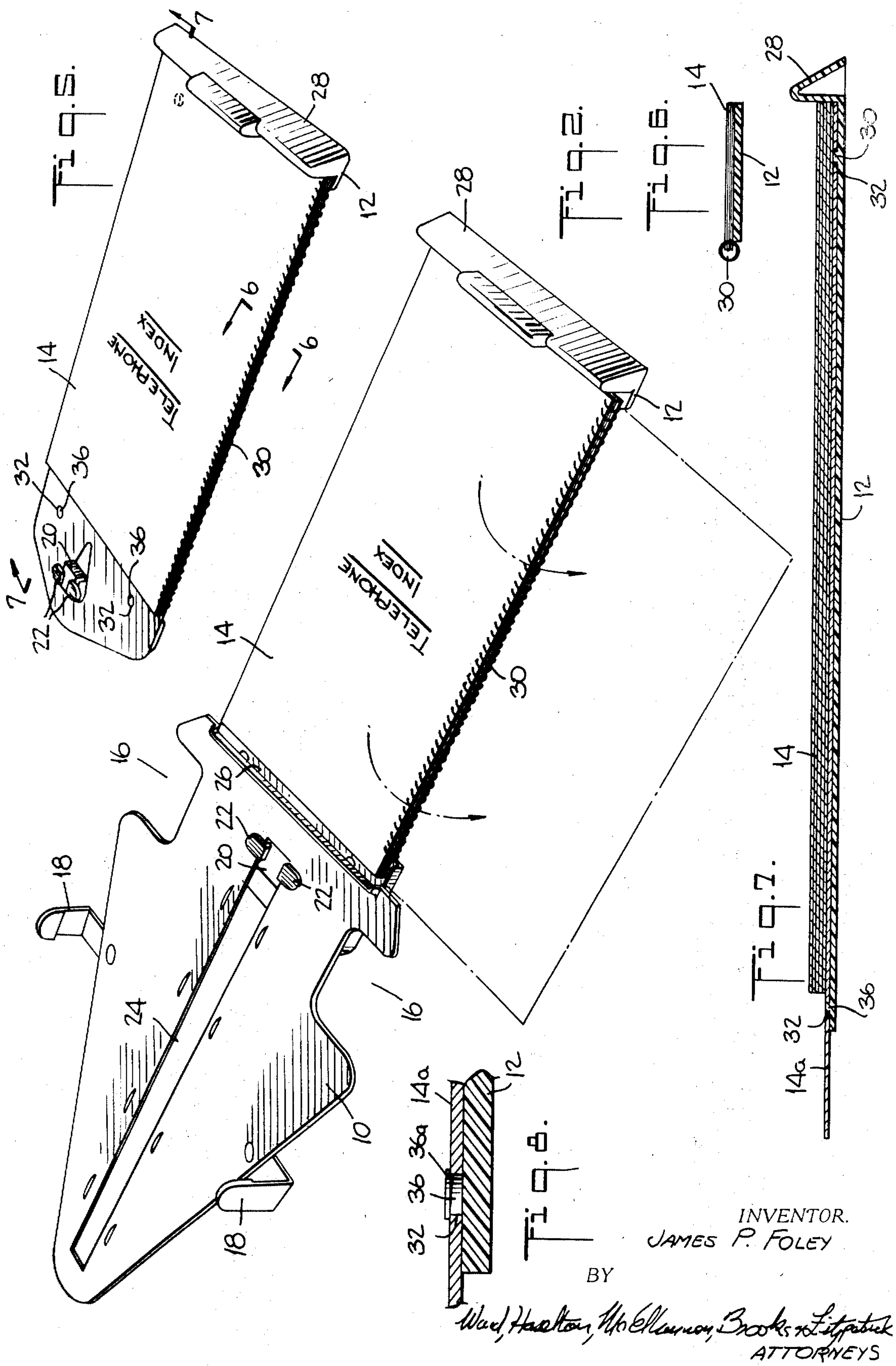
FIG. 2 is a view similar to FIG. 1 showing the telephone index device in opened condition.
FIG. 5 is a perspective view showing the slide member and index sheet arrangement as assembled.
FIG. 6 is a section view taken along line 6—6 of FIG. 5.
FIG. 7 is a section view taken along line 7—7 of FIG. 5.
FIG. 8 is an enlarged fragmentary view of a portion of the device as shown in FIG. 7.

The index sheets 14 are carried in book-like fashion on the slide member 12. As shown, a spiral binding 30 in the form of a wire helix is provided along one longitudinal edge to hold the sheets 14 together. Thus when the slide member 12 is opened, as shown in FIG. 2, the individual sheets 14 may be manipulated like the pages of a book, and they will lie flat at any opened sheet. This is of considerable importance in regard to its utility as a telephone index. This is because the user must be free to use one hand in holding the telephone headset and the other hand in dialing. If the index arrangement has to be held open, either the dialing operation or the holding of the headset is hampered.

Turning now to FIG. 3, it will be seen that the index sheet arrangement 14 is formed with a bottom sheet **14*a* having a plurality of holes 32 formed therein. More specifically two of the holes 32 are formed along one longitudinal edge of the sheet 14*a*, while the remaining hole is formed close to the rear of the other longitudinal edge. The sheet 14*a*, moreover, is extended rearwardly beyond the other sheets; and it is provided with a larger, triangular-shaped hole 34 which fits over the lug 20 and tabs 22 of the slide member 14** to secure the index sheet arrangement to the slide member.

An adhesive substance, such as glue, paste or the like is spread over the bottom surface of the sheet **14*a*. In assembling the index sheet arrangement 14 and the slide member 12, as shown in FIG. 4, the triangular shaped hole 34 is fitted over the lug and tabs 22 and 24; and the index sheet arrangement 14 is lowered onto the surface of the slide member 12. As shown in FIGS. 3 and 4, there are formed a plurality of upstanding lugs 36 on the surface of the slide member 12, and these are in alignment with and protrude up through the holes 32 in the bottom sheet 14*a* when the sheet arrangement is in proper position. This hole and lug arrangement permits precise yet rapid positioning of the index sheet arrangement on the slide member when carried out as illustrated in FIG. 4. As there shown, the entire index sheet arrangement 14 is bent back longitudinally and the holes 32 along one edge of the lower sheet 14*a* are positioned over their corresponding lugs 36. This provides proper positioning; and the index sheet arrangement is then laid flat down upon the slide member 12** as shown in FIG. 5.

Reverting to FIG. 4, it will be seen that the longitudinal edge of the slide member 12 corresponding to the spiral binding 30 is formed with a longitudinal recess 38. This recess accommodates the spiral binding 30 without the binding itself providing any connection between the index sheet assembly 14 and the slide member 12. The significance of this arrangement can be seen in FIG. 6. As there shown, the index sheet arrangement 14 is of a total thickness not much in excess of the slide member 12 itself. In order to permit the individual sheets 14 to be hinged for free movement and ability to lay flat at any page, the diameter of the binding must be significantly in excess of the total thickness of the sheets it binds. In the present invention the spiral binding 30 does not pass through the slide member, but instead, by virtue of the recess 38, it in effect hangs over the edge of the slide member. This permits a maximum size binding for proper sheet manipulation, yet it permits the binding to be of a small enough diameter to fit through the transverse slot 26. As a result, a maximum number of sheets may be carried without the spiral binding 30 becoming jammed in the transverse slot 26 in the front of the frame member 10.

Turning now to FIG. 7, it will be seen that the alignment lugs 36 do not extend appreciably beyond the upper surface of the bottom sheet **14*a*; and therefore they do not interfere with the other sheets. Their function in maintaining the proper positioning of the sheet assembly 14, however, is preserved. Thus they serve to ensure that the binding 30 will not ride up on the edge of the slide member 12 and bind in the transverse slot 26** in the front member.

FIG. 8 illustrates a modification whereby the alignment lugs 36 are provided with a lip **36*a* about their upper edge, this lip serving as a mechanical lock to prevent the bottom sheet 14*a* from being lifted up off the slide member 12** except under excessive force. This in some circumstances will obviate the need for adhesive substance between the bottom sheet and the slide member.

Although a certain specific embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A telephone index device for use with a telephone having an underside and legs for spacing said underside from a supporting surface, said device comprising a frame member configured and having a height to fit under said telephone in the space between said underside and the supporting surface, said frame member having attachment means thereon for securing same to said telephone, said frame member being formed with a slot-like front opening for accepting telephone index sheets, said opening having a height no greater than the height of said space, a flat elongated drawer-like slide member having a handle formed at one end and a bottom portion, said slide member being configured to slide into and out from said front opening in said frame member, a plurality of telephone index sheets having side edges and end edges and arranged in a stack and bound together along one side edge by means of a helix having a helix diameter less than the height of said front opening, the lowermost of said sheets being secured to said bottom portion in a position thereon such that said helix lies adjacent to but beyond the edge of said bottom portion and extends in the direction of movement of the slide member and such that at least a portion of said helix lies below the lower surface of said lowermost sheet whereby said bottom portion serves to support said telephone listing sheets for enabling same to be moved into and out from said frame member without interfering with the movement of said helix through said slot.

2. A telephone index device as in claim 1 wherein said bottom portion has a width at its ends substantially equal to the width of said opening but has a narrower width intermediate said ends to form a recess along one longitudinal edge for accommodating said helix.

3. A telephone index device as in claim 1 wherein said lowermost sheet is adhesively secured to said bottom portion and said slide member is provided with spaced-apart, upstanding lugs which project into corresponding holes in the bottom of said index sheets.

4. A telephone index device as in claim 3 wherein at least two of said lugs are located along one longitudinal edge of said slide member remote from said helix,

5. A telephone index device as in claim 1 wherein said slide member is provided with spaced-apart, upstanding lugs which project into corresponding holes in the lowermost of said sheets and said lugs are of a height substantially equal to the thickness of the lowermost sheet in said assembly.

6. A telephone index device as in claim 5 wherein the lowermost sheet of said assembly is adhesively secured to said slide member.

7. A telephone index device as in claim 5 wherein the upper edge of each lug is formed with a lip which interlocks over the lowermost sheet of said assembly.

8. A method of assembling an assembly of telephone index sheets on a drawer-like slide member which slides in and out from under a telephone, said slide member having a pair of lugs thereon spaced in the direction of movement of the member and at least the lowermost of said sheets having holes therein adjacent an edge thereof corresponding to said lugs, said method comprising the steps of applying an adhesive to one of the facing surfaces of the slide member and the assembly, bending the assembly back about an axis substantially parallel to said edge of said lowermost sheet, placing said edge onto said slide member in such a manner that said lugs enter into said corresponding holes in said lowermost sheet, and thereafter, while said lugs and holes are thus interlocked, unbending said index sheet assembly so that it lies flat upon said slide member.

References Cited

UNITED STATES PATENTS

| | | | |
|---|---|---|---|
| 2,283,690 | 5/1942 | Munson | 40—336 X |
| 2,479,752 | 8/1949 | Lohr | 40—336 X |
| 2,806,715 | 9/1957 | Smith | 281—15 |
| 3,083,493 | 4/1963 | Malachuk | 40—336 X |
| 3,243,908 | 4/1966 | Foley | 40—336 |

EUGENE R. CAPOZIO, Primary Examiner

W. H. GRIEB, Assistant Examiner

U.S. Cl. X.R.

281—15